US008016158B2

(12) United States Patent
Walsh et al.

(10) Patent No.: US 8,016,158 B2

(45) **Date of Patent: *Sep. 13, 2011**

(54) BEVERAGE LID DISPENSER

(75) Inventors: Kenneth T. Walsh, Fort Dodge, IA (US); Nicholas R. Walsh, Fort Dodge, IA (US)

(73) Assignee: Kennik Innovatons, LLC, Fort Dodge, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/367,733

(22) Filed: Mar. 3, 2006

(65) Prior Publication Data

US 2006/0249527 A1 Nov. 9, 2006

Related U.S. Application Data

(63) Continuation-in-part of application No. 11/121,373, filed on May 4, 2005.

(51) Int. Cl.
*B65G 59/00* (2006.01)

(52) U.S. Cl. ........ 221/289; 221/295; 221/268; 221/303; 221/223

(58) Field of Classification Search ........... 221/1–312 C
See application file for complete search history.

(56) References Cited

U.S. PATENT DOCUMENTS 480,018 A 8/1892 Hunter
1,028,458 A * 6/1912 Hassmann .................... 221/152
1,260,432 A 3/1918 Nias
1,272,701 A 7/1918 Nias
1,311,170 A 7/1919 Lockwood et al.
1,666,008 A 4/1928 Graffenberger
1,761,009 A 6/1930 DeVries
2,704,629 A * 3/1955 Andre et al. .................... 53/306
2,834,511 A * 5/1958 Booth ........................... 221/116
3,040,494 A 6/1962 Anderson
3,165,234 A 1/1965 Conklin et al.
3,556,344 A 1/1971 Lane
3,702,103 A 11/1972 Price et al.
3,768,694 A * 10/1973 Miller ........................... 221/221
3,795,344 A 3/1974 Falk et al.

(Continued)

FOREIGN PATENT DOCUMENTS

FR 1463166 6/1966

OTHER PUBLICATIONS

Logicor "Redi-Lid Sanitary Lid Dispenser", http://www.logicorllc.com.

(Continued)

*Primary Examiner* — Michael K Collins

(74) *Attorney, Agent, or Firm* — McKee, Voorhees & Sease, P.L.C.

(57) ABSTRACT

The current invention is a lid dispensing device and method of use comprising a base unit, a lid holder operatively connected to the base unit, a blade operatively mounted to the base which moves between a first position and a second position, the blade supporting a stack of lids by engaging a first lid in the stack of lids while the blade is in the first position, and the blade allowing the first lid to fall through an aperture in the blade away from the stack of lids, and still support the remaining stack of lids as the blade moves to the second position.

5 Claims, 18 Drawing Sheets

U.S. PATENT DOCUMENTS 4,319,441 A 3/1982 Credle
4,742,937 A 5/1988 Blom
4,881,660 A 11/1989 Suttles
4,897,019 A 1/1990 Lemaire et al.
4,949,526 A 8/1990 Brogna et al.
5,012,952 A 5/1991 Franz
5,038,969 A 8/1991 Berger
5,131,562 A 7/1992 Brown
5,328,052 A 7/1994 Kizilos
5,383,571 A 1/1995 Gunderson
5,513,096 A 4/1996 Casler, Jr.
5,702,029 A * 12/1997 Yang .............................. 221/221
5,819,982 A 10/1998 Brown
5,918,765 A 7/1999 Blankenship et al.
5,944,220 A 8/1999 Garske
5,960,989 A * 10/1999 Gunderson ................... 221/220
6,113,345 A 9/2000 Ashby
6,357,624 B1 3/2002 Brown
6,474,503 B2 11/2002 David
6,527,139 B2 3/2003 Seagle
6,832,694 B2 * 12/2004 Goeking et al. .............. 221/195
6,832,698 B1 12/2004 Dybul
7,011,231 B2 * 3/2006 Boykin et al. ................ 221/303
7,337,919 B2 * 3/2008 Walsh et al. .................. 221/221
7,422,127 B2 9/2008 Christoffersen et al.
7,731,058 B2 * 6/2010 Stamatis Filho et al. ..... 221/221
2001/0038017 A1 11/2001 Davis
2005/0194397 A1 9/2005 Hecht
2005/0247724 A1 11/2005 Gapp
2006/0169712 A1 * 8/2006 Yitzchaki ...................... 221/221
2007/0228067 A1 10/2007 Hecht

OTHER PUBLICATIONS

ACRYFAB Innovative Food and Accessory Display Products, “LidSaver”, http://www.acryfab.com.

* cited by examiner

BEVERAGE LID DISPENSER

CROSS-REFERENCE TO RELATED APPLICATIONS

This application is a continuation-in-part application of U.S. application Ser. No. 11/121,373 filed May 4, 2005, which is incorporated herein by reference in its entirety.

BACKGROUND OF THE INVENTION

This invention relates to disk dispensing devices. Specifically, this invention relates to a beverage lid dispenser. The invention can be used with both disposable and non-disposable beverage lids.

When one purchases a drink at a convenience store or restaurant, they commonly dispense the drink from a soda fountain, coffee pot, etc. It is also common to then get a lid to put on top of the cup to prevent the drink from spilling. Therefore, many people pick up a drink lid from a stack of lids which is sitting near the drink dispenser. One problem with this is that when picking up the lid one may accidentally pick up several lids at the same time. This leads to some of the lids falling on the countertop or the floor and being wasted. Another problem is that as people pick up more than one lid they touch the other lids and consequently spread germs.

Therefore, it is desirable to have a beverage lid dispenser which corrects the foregoing problems.

The primary feature, or advantage of the current invention is to provide an improved beverage lid dispenser and method of use.

Another feature or advantage of the current invention is a beverage lid dispenser which reduces waste of disposable lids.

A further feature or advantage of the current invention is a beverage lid dispenser which reduces spreading of germs on the dispensed lids.

A further feature or advantage of the current invention is a lid dispenser which can dispense lids right side up or upside down.

A still further feature or advantage of the current invention is a beverage lid dispenser which is economical to manufacture, durable in use, and efficient in operation.

Yet another feature or advantage of the current invention is a method of dispensing a drink lid from a lid dispenser.

One or more of these or other features or advantages of the invention will be apparent from the specification and claims that follow.

SUMMARY OF THE INVENTION

The current invention can be used for dispensing any type of disk which contains a rim around the outside of the disk. However, for simplicity sake, the invention will be shown and described as a disk dispensing device which dispenses disposable beverage lids.

One or more of the foregoing may be achieved by a lid dispensing device comprising a base unit, a lid holder operatively connected to the base unit, a blade, sheet or other surface operatively mounted to the base unit which moves between a first position and a second position, the blade supporting a stack of lids by engaging a first lid in the stack of lids while the blade is in the first position, and the blade allowing the first lid to fall through an aperture in the blade away from the stack of lids, and still support the remaining lids as the blade moves to the second position.

One or more of the foregoing may also be achieved by a blade for use in a disk dispensing device comprising opposite first and second faces and opposite first and second ends, a first cutout on the first face near the first end, a second cutout on the first face near the second end which intersects the first cutout and is larger than the first cutout, a third cutout on the second face near the second end, a fourth cutout on the second face near the first end which intersects the third cutout and is larger than the third cutout, and the cutouts on the first face and the cutouts on the second face intersect to form an aperture through the blade.

One or more of the foregoing may also be achieved by a method of dispensing a drink lid from a lid dispenser comprising the steps of causing a blade, which is part of the dispenser, to slide from a first position to a second position thereby causing a second lid in a stack of lids to be supported by the blade and a first lid in the stack to fall from the blade and be dispensed and allowing the blade to return to the first position.

DETAILED DESCRIPTION OF THE PREFERRED EMBODIMENT

The present invention will be described as it applies to its preferred embodiment(s). It is not intended that the present invention be limited to the described embodiments. It is intended that the invention cover all modifications and alternatives which may be included within the spirit and scope of the invention.

The current invention can be used for any disk dispensing device where the disks to be dispensed contain an outer rim. However, for simplicity sake, the current invention will be shown and described as a beverage lid dispenser which dispenses a disk-shaped disposable drink lid.

Figure 16:
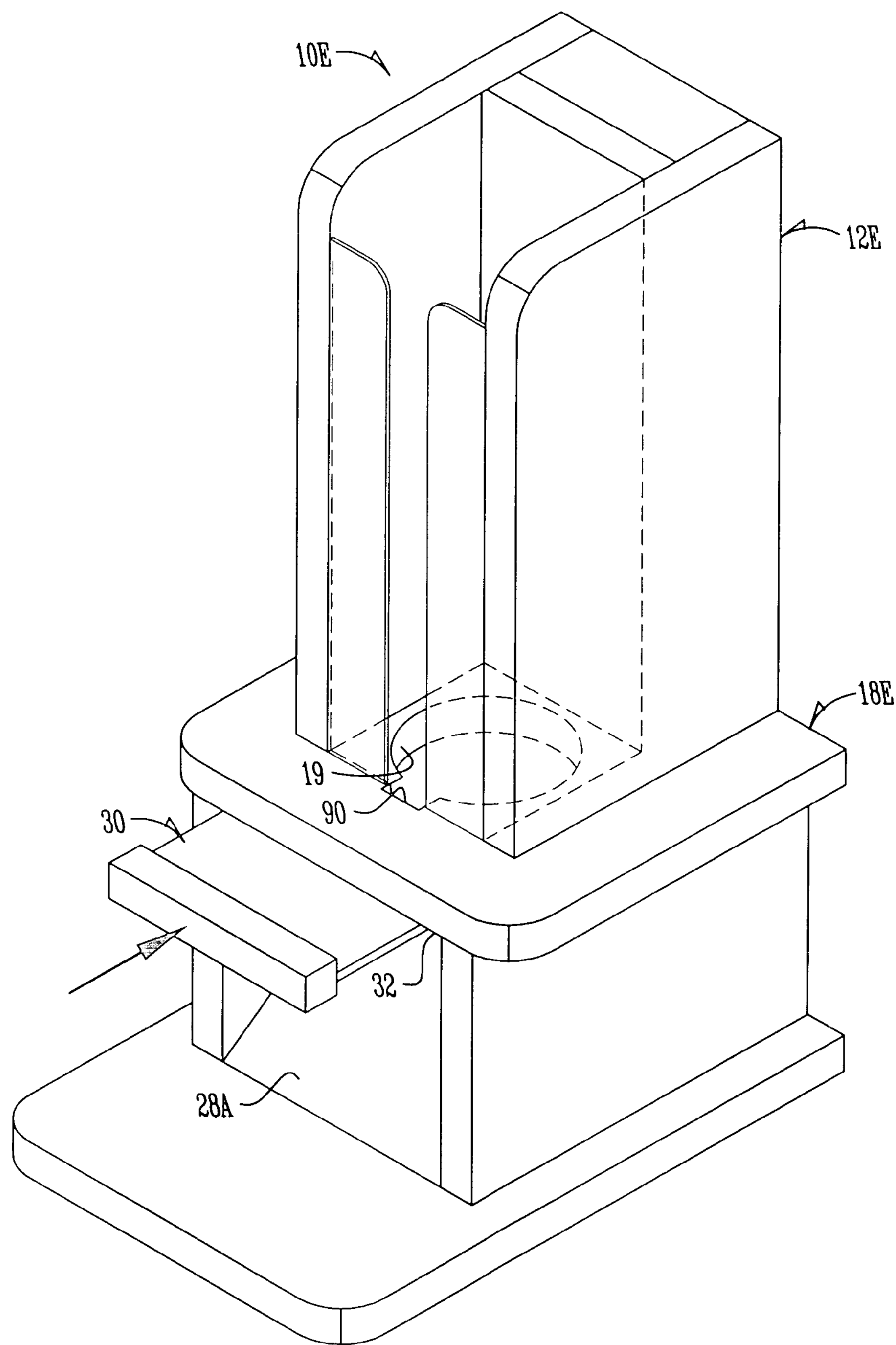
FIG. 16 is a perspective view of another embodiment of a single lid dispenser.

Referring to the figures, several different embodiments of beverage lid dispensers are shown as 10A, 10B, 10C, 10D and 10E (described collectively as 10). The units generally comprise a base unit 18A, 18B, 18C, 18D and 18E (collectively as 18). The base units 18 may comprise one or more base legs 20 to help support the unit. A lid holder assembly 12A, 12B, 12C, 12D and 12E (collectively as 12) is preferred to be above the base unit 18 and configured to hold a stack of disposable lids 14. The base unit should have an opening 19 which allows a lid 17 to pass from the lid holder 12 to the blade 30. The opening 19 may have one or more cutouts 90, as shown in FIG. 16, to accommodate lids with tabs (not shown). The lid dispenser assembly 10 of the current invention can be of any shape or size to dispense the given disk or disposable lid stack 14.

Figure 3:
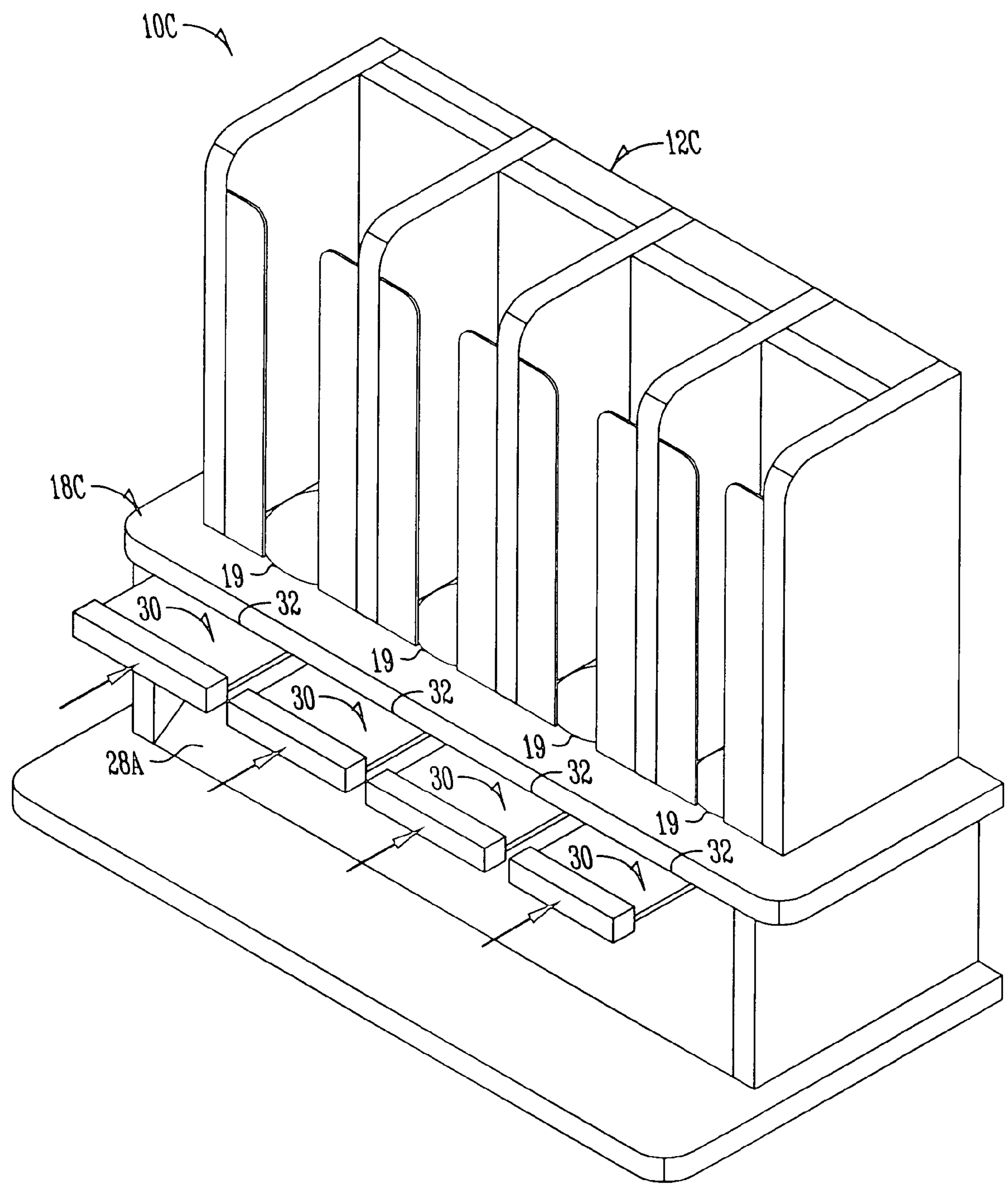
FIG. 3 is a perspective view of an embodiment of a multiple dispenser.

The dispenser assembly 10 of the current invention can have a single lid holder assembly 12A, 12B, 12D, and 12E, as shown in FIGS. 1, 2, 4, 5, 6, and 16 or can have a multiple lid holder assembly 12C, as shown in FIG. 3. Furthermore, the lid holder assemblies 12 can be of any shape or design so long as they hold a stack of lids 14. It is also contemplated that a multiple sized lid dispenser could even have a carousel (not shown) which rotates allowing a user to rotate the lid holder assembly 12 around until the user finds the proper lid stack 14 for dispensing. In addition, a replaceable lid stack cartridge (not shown) can be used to replace an empty cartridge so the person re-filling the dispenser 10 does not have to touch the new lids. They simply replace an empty cartridge with a full one.

The lid holder assemblies 12 can be positioned in any orientation so long as the lid stack 14 is maintained relatively perpendicular to the blade 30, which is preferred to be slidably mounted in the base unit 18. For example, as shown in FIGS. 1-3, 5-6 and 16, the lid holder assemblies 12 are relatively vertical, thereby allowing gravity to keep the lid stack 14 engaging the slidable blade 30. As another example, in FIG. 4, the lid holder assembly 12D is much more horizontal. In this case, a gravity ball 13, spring, or other similar device, can be used for keeping the lid stack 14 engaging the blade 30. The lid holder assemblies 12 preferably hold the lid stack 14 in place while the blade 30 moves. However, the invention can work if the blade 30 is held while the lid stack holder 12 moves with respect to the blade 30.

Again, the types of disks which can be dispensed by the current invention are best shown by a disposable drink lid 14. The lid 14 has a disk portion 15 which is the top part of the lid and a rim portion 16 which generally goes around the disk 15 and expands outward more at the bottom of the disk 15. This allows the rim 16 of the disk 15 to engage a first cutout 42 and a third cutout 46 on the blade 30, as described later, for dispensing the first lid 17 in a stack of lids 14.

Figure 4:
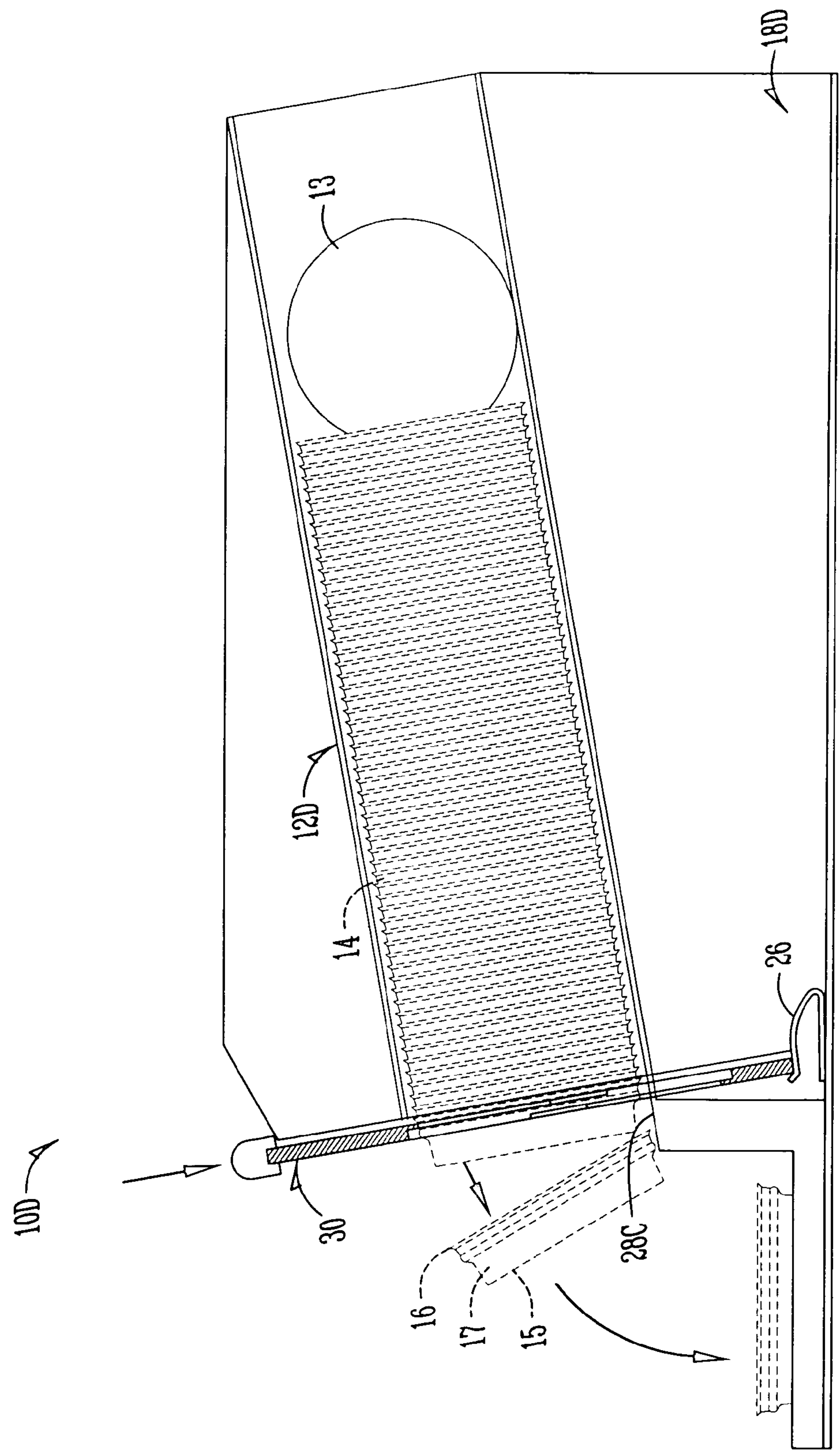
FIG. 4 is a side view of an embodiment of a horizontal-type dispenser.

The lid dispenser assemblies 10 may be equipped with a blade activator, such as 22A or 22B, or similar type device, which is operatively connected to a blade activator linkage 24. When the level of 22A or the knob of 22B is moved, it causes the blade activator linkage 24 to cause the blade 30 to slide within the blade channel 32. Any type of blade activator 22 can be used with the current invention to cause the blade 30 to slide within the blade channel 32. Additionally, the lid dispenser assembly 10 can be constructed without a blade activator 22. Examples of this are shown in FIGS. 3, 4 and 16. In these examples, a user simply pushes the end of the blade 30 itself or something attached to it to cause the sliding action of the blade 30 within the blade channel 32.

It is preferred, but not necessary, that a blade return spring 26 or other biasing-type device be operatively connected to the blade 30 to return the blade 30 to its original resting place once the blade 30 has moved within the blade channel 32. In other words, the lid dispenser assembly 10 can be constructed with or without a blade return spring 26 or other similar biasing device. Without the blade return spring 26 or other similar biasing device, a user would simply manipulate the blade 30 in one direction and then return it to the original position for dispensing a lid 17 thereby resetting the dispenser 10.

Figure 1:
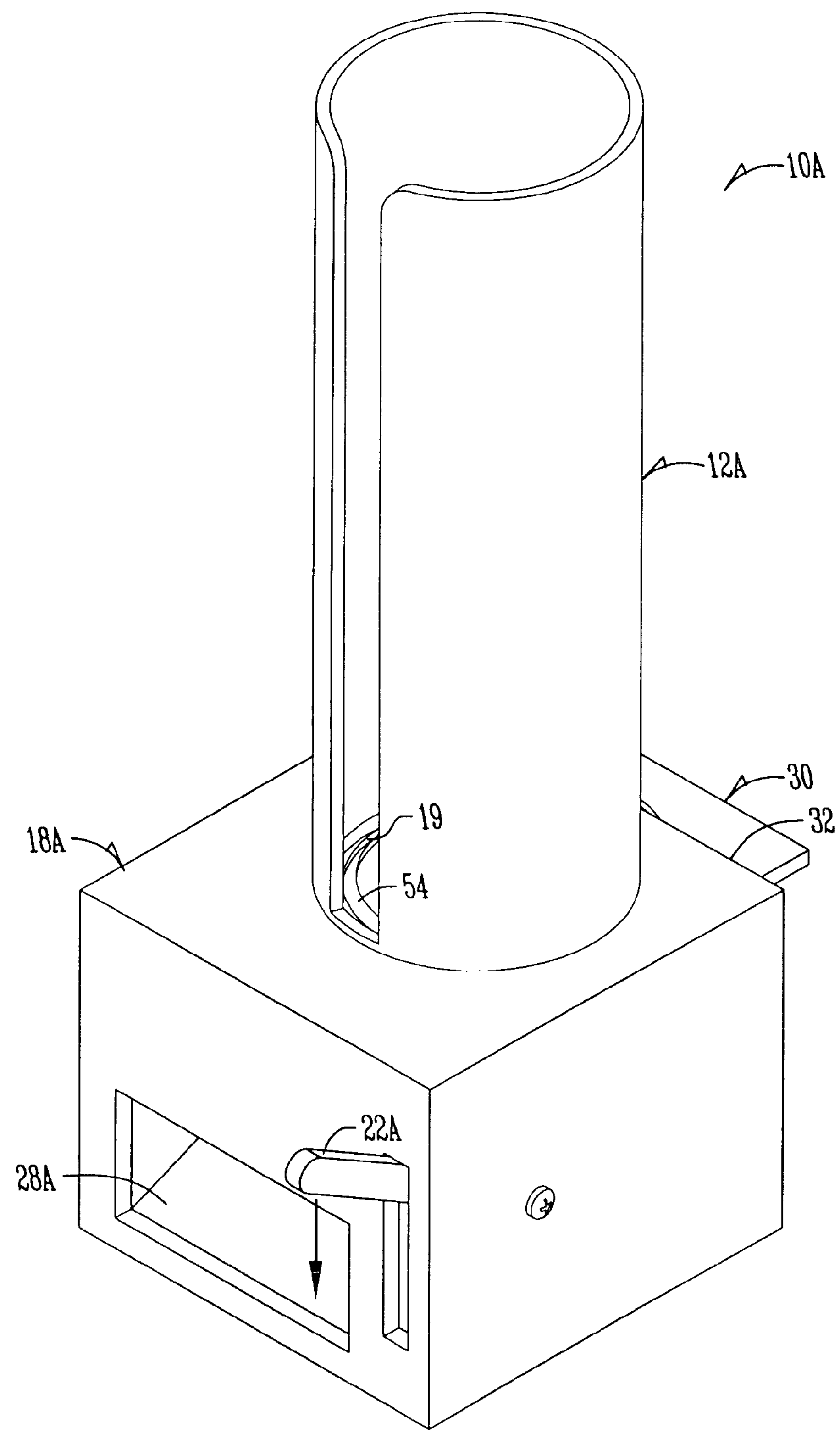
FIG. 1 is a perspective view of one embodiment of a single dispenser.
Figure 2:
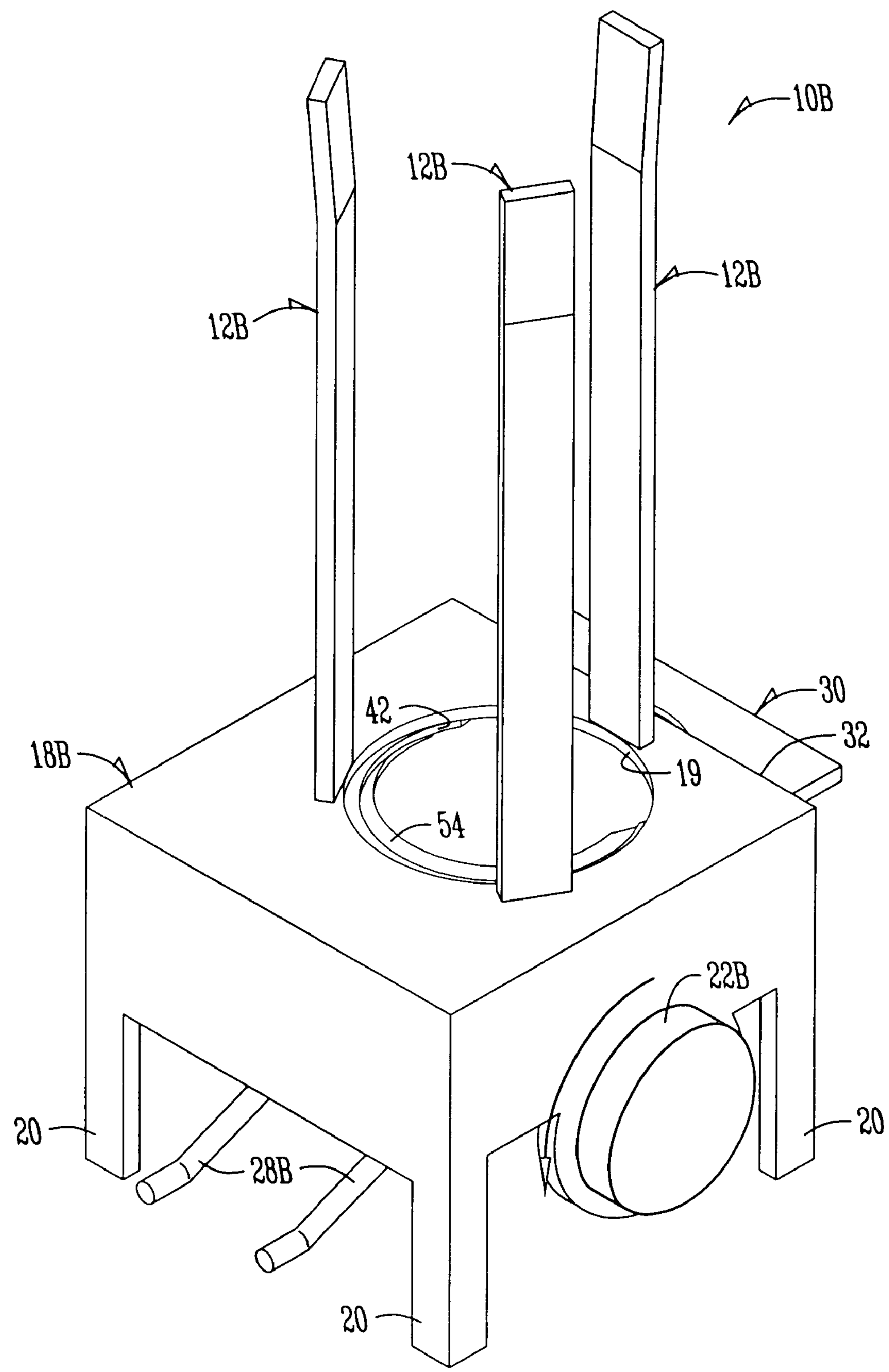
FIG. 2 is a perspective view of another embodiment of a single dispenser.

It is also preferred, but not necessary, that the lid dispenser assembly 10 be constructed with a lid dispensing slide/catch 28. Examples of such dispensing slides 28 are shown in FIGS. 1, 3 and 16 as 28A, FIG. 2 as 28B, and FIG. 4 as 28C (collectively 28). Other types of dispensing slide/catches 28 can be used with this invention and are contemplated. The purpose for the dispensing slide/catch 28 is simply to allow a lid 17 which has been dispensed to be delivered more conveniently to the user of the dispenser assembly 10.

Figure 5:
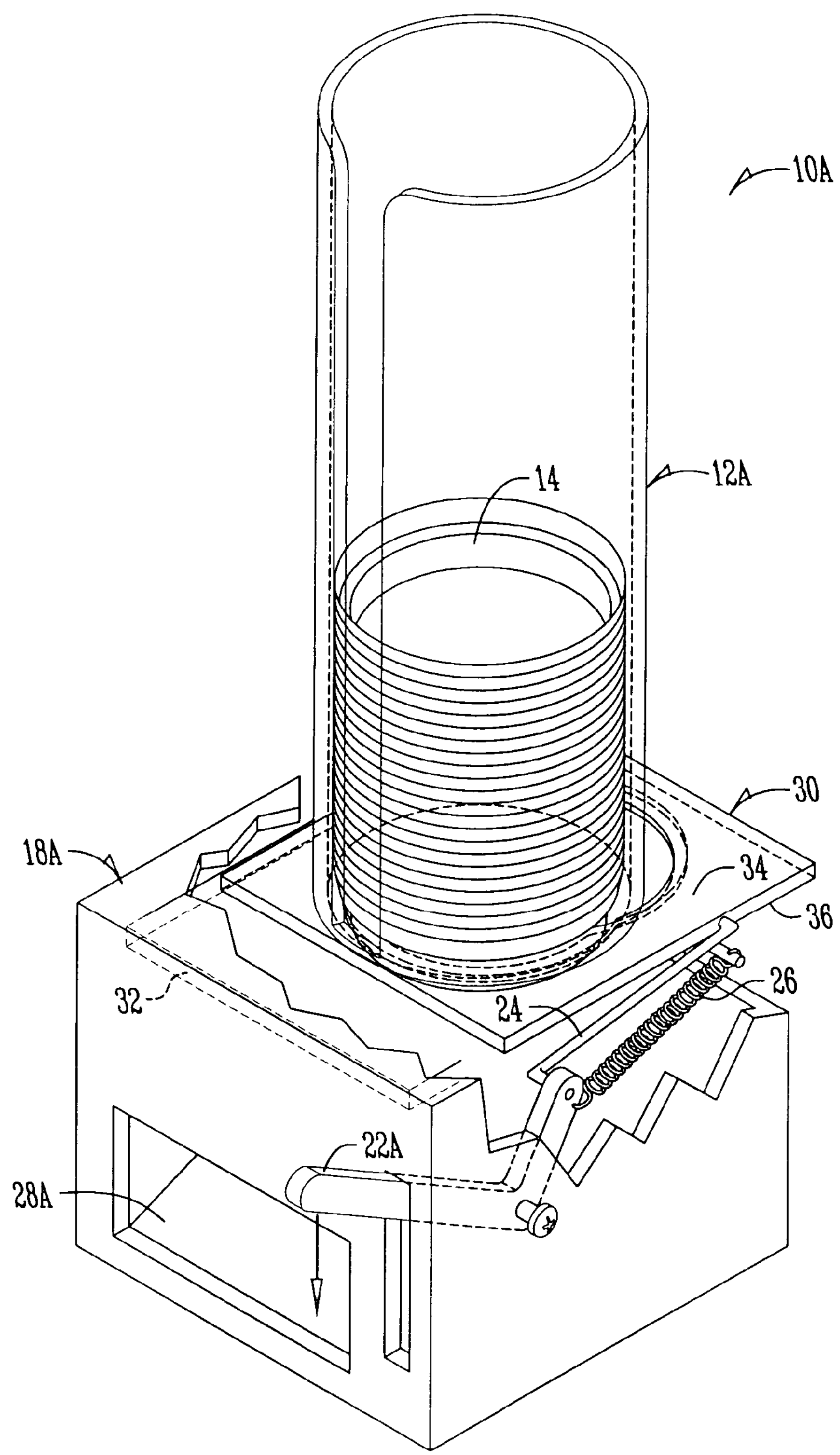
FIG. 5 is a perspective view cutout of one embodiment of a lid stack resting on the blade.
Figure 6:
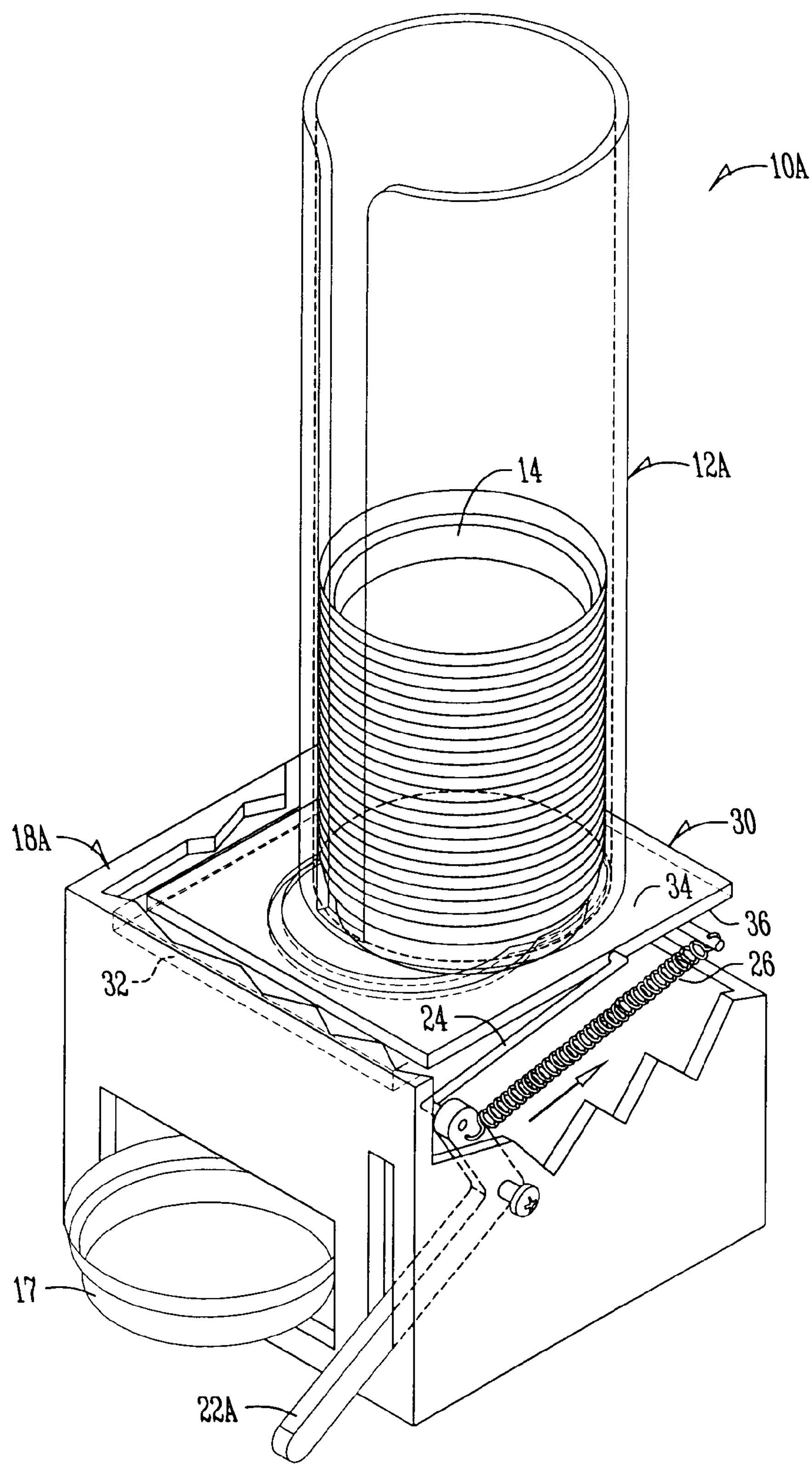
FIG. 6 is a perspective view cutout of one embodiment of the current invention with the blade dispensing a lid.

FIGS. 5 and 6 show perspective cutout views of one embodiment of a lid dispenser assembly 10A, at rest in FIG. 5, and dispensing a lid 17 in FIG. 6. As shown in FIGS. 5 and 6, when a user causes the blade 30 to slide within the blade channel 32, the bottom lid or lid to be dispensed 17 is separated from the remaining stack of lids 14 by the blade 30. This allows the bottom or dispensed lid 17 to fall from the stack of lids 14 through an aperture in the blade 50 and slide down a dispensing slide 28 and be presented to the user. Once the user releases the blade activator 22 or the blade itself 30, depending on the embodiment of lid dispenser 10 being used, the blade 30 is preferred to return to its original resting place by the aid of the blade return spring 26 and the dispenser 10 is reset for the next use.

Figure 7:
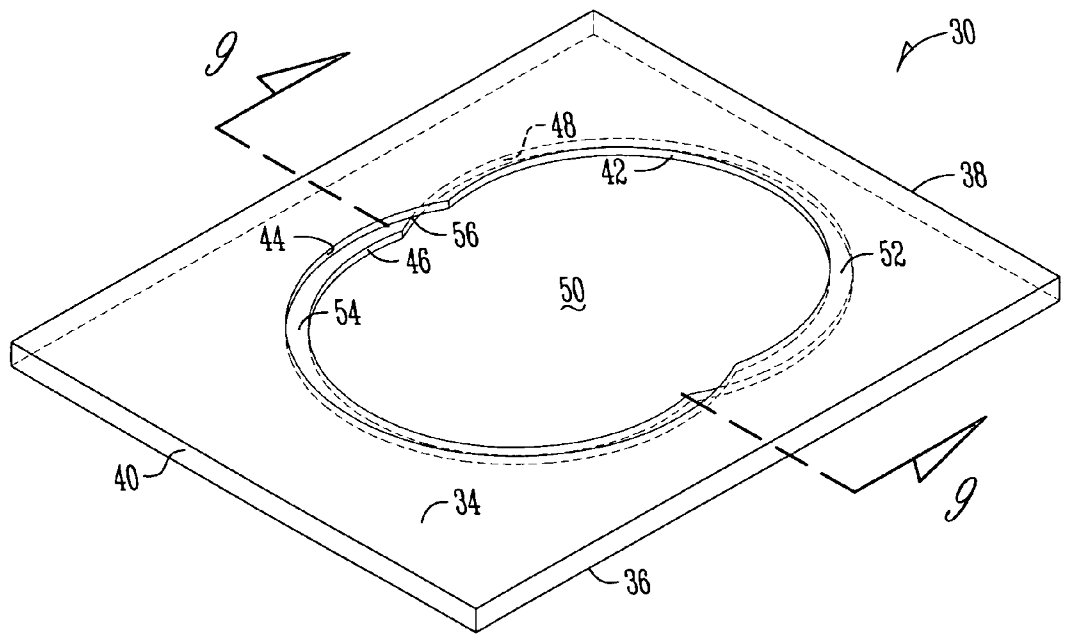
FIG. 7 is a perspective view of one embodiment of a blade.
Figure 8:
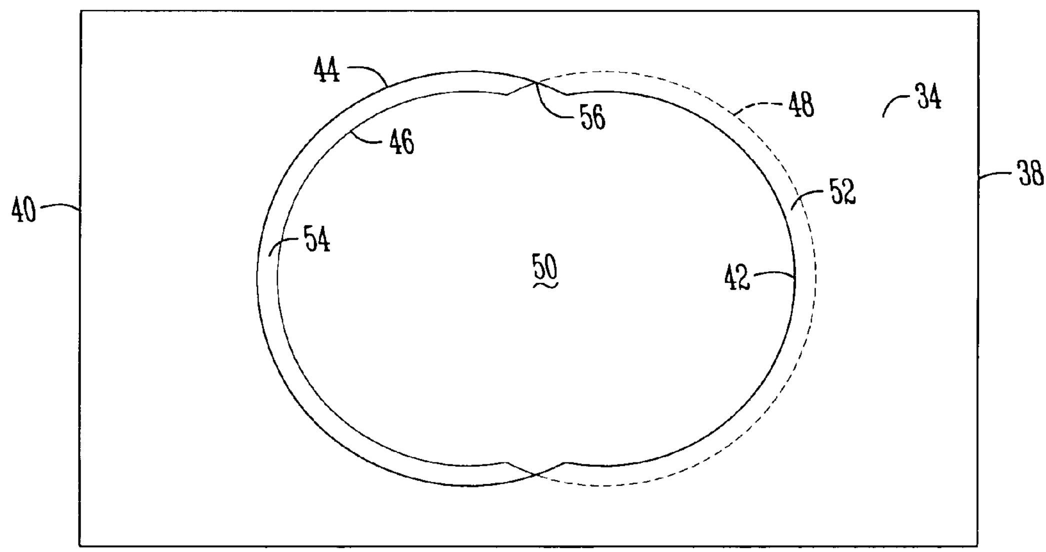
FIG. 8 is a top view of the embodiment of the blade shown in FIG. 7.
Figure 9:
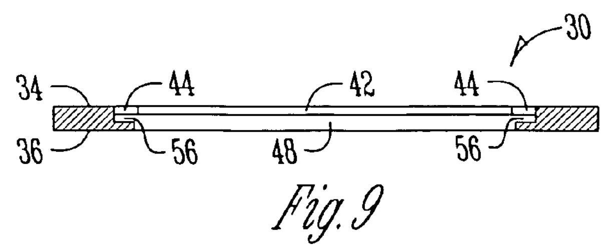
FIG. 9 is a sectional view of the embodiment of the blade taken along line 9-9 of FIG. 7.

FIGS. 7-15 show embodiments of the blade 30 for use with this invention and the way the blade 30 dispenses the bottom lid 17 from a stack of lids 14. FIGS. 7-8 show the blade in a perspective view, and top view, respectively. FIG. 9 is a sectional view of the blade 30 taken along line 9-9 of FIG. 7. The blade is configured with a first face 34 and an opposite second face 36. The blade also has a first end 38 and an opposite second end 40. It is preferred that the first face 34 be relatively parallel to the second face 36, but it is not necessary. Additionally, it is preferred that the blade first end 38 be relatively parallel to the blade second end 40, however, again this is not necessary. The blade 30 has a first cutout 42, a second cutout 44, a third cutout 46, and a fourth cutout 48. The blade cutouts 42-48 can be formed into the blade 30 by milling, molding, or any other manufacturing processes which can create a proper shape for the blade 30. In other words, the cutouts do not have to be formed by cutting away material, it can be formed by molding or other methods.

For orientation purposes, the first cutout 42 is preferred to be on the first face 34 and located closer to the first end 38 than it is the second end 40. The size and shape of the first cutout 42 is determined by the size and shape of the lids 14, 17 to be dispensed. The first cutout 42 is preferred to be sized so that a lid 14, 17 can be supported by the lid rim 16 without falling through the first cutout ledge 52. Therefore, the first cutout 42 can be any size or shape which allows a lid 17 or lid stack 14 to rest upon the first cutout ledge 52 without falling through the cutout 42.

The second cutout 44 is also preferred to be on the first face 34, intersecting with the first cutout 42, but nearer to the second end 40 than the first end 38. Again, the size and shape of the second cutout is determined by the size and shape of the lids 14, 17 to be dispensed. The size and shape of the second cutout 44 should be such that the lid to be dispensed 14, 17 can pass through the second cutout 44. In other words, the second cutout 44 is larger than the lid rim 16.

The blade third cutout 46 is located on the second face 36 closer to the second end 40 than the first end. With this configuration, the lids to be dispensed 14, 17 can fall through the second cutout 44 and be supported by a third cutout ledge 54. The third cutout 46 and the second cutout 44 form the third cutout ledge 54. This ledge 54 suppoIts the stack of lids 14, 17 by supporting the lid rim 16 similar to that as the first cutout ledge 52. Thus, the third cutout can be any size or shape so that it can hold the lid or lid stack 14, 17 by the third cutout ledge 54.

The fourth cutout 48 is similar to the second cutout 44 except, it is on the second face 36 and more closely located to the first end 38 of the blade 30. This fourth cutout 48 again allows the lid which is to be dispensed, 14, 17 to fall through the cutout 48 and be dispensed. Thus, the size and shape of the fourth cutout 48 is determined such that it should be larger than the rim 16 of the lid 14, 17 to be dispensed.

The fourth cutout 48 and the first cutout 42 form a blade first cutout ledge 52 similar to the blade third cutout ledge 54. The first cutout ledge 52 allows the lid stack 14 to be supported by the lid rim 16 when the lid rim 16 is setting on the first face 34 of the blade 30.

The blade cutouts can be formed with a wedge device 105 to separate the first lid 17 from the stack of lids 14 to allow the first lid 17 to fall away from the stack 14.

A blade groove 56 is formed between the first cutout ledge 52 and the second cutout ledge 54. The blade groove 56 allows for the lid rim 16 to slide between the third cutout 46 and out the fourth cutout 48 as the blade 30 slides for operation of the lid dispenser assembly 10.

Figure 17:
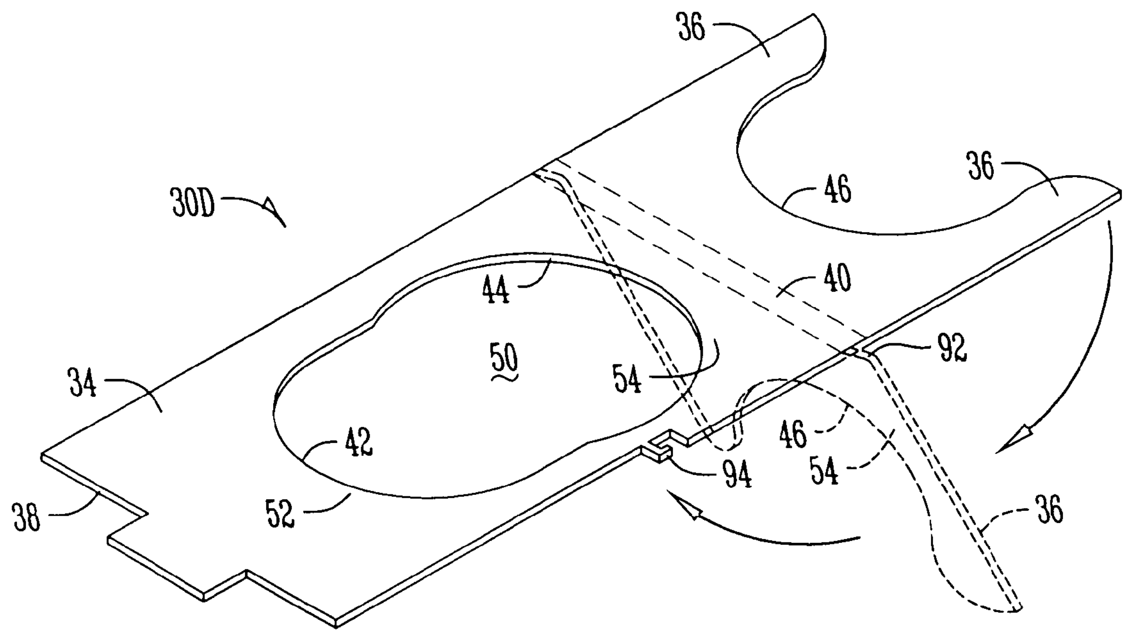
FIG. 17 is a perspective view of one embodiment of a blade flat pattern made from sheet material.
Figure 18:
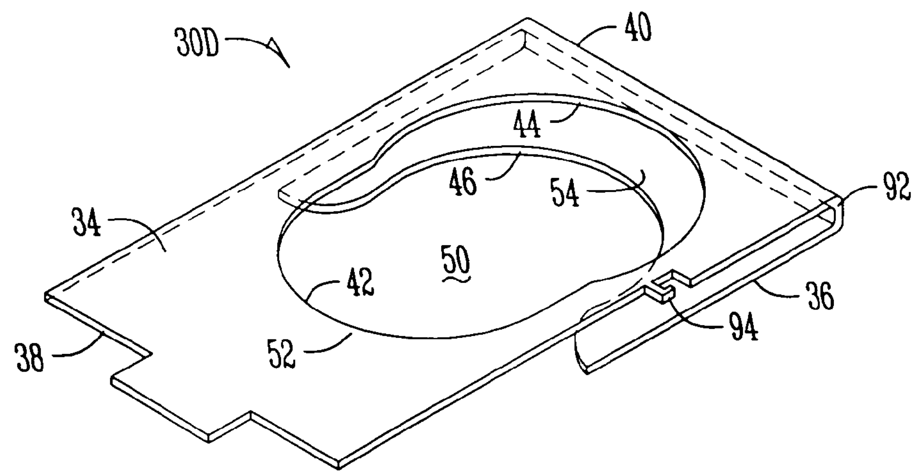
FIG. 18 is a perspective view of the blade shown in FIG. 17 formed to shape.

FIGS. 17 and 18 show an embodiment of the blade 30D made from sheet material. As shown, the blade 30D can be made from a single piece of metal folded along a bend 92, and thus having the blade third cutout 46 end-up below the blade second cutout 44, creating the blade third cutout ledge 54 for supporting the lids 14, 17. Shown also is a blade spring hook 94 that can mate with a spring 26, as shown in FIGS. 5 and 6. The blade 30D can be cutout or stamped out of sheet metal, plastic or the like and formed.

Figure 10:
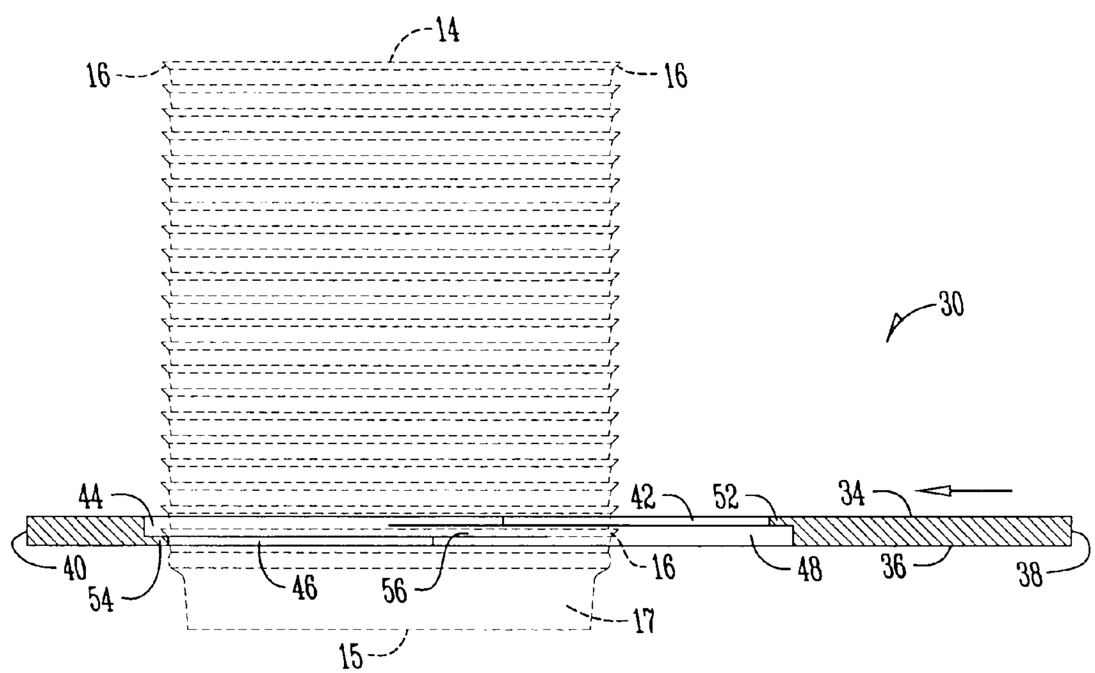
FIG. 10 is a side view of an embodiment of a blade in a rest position.
Figure 10A:
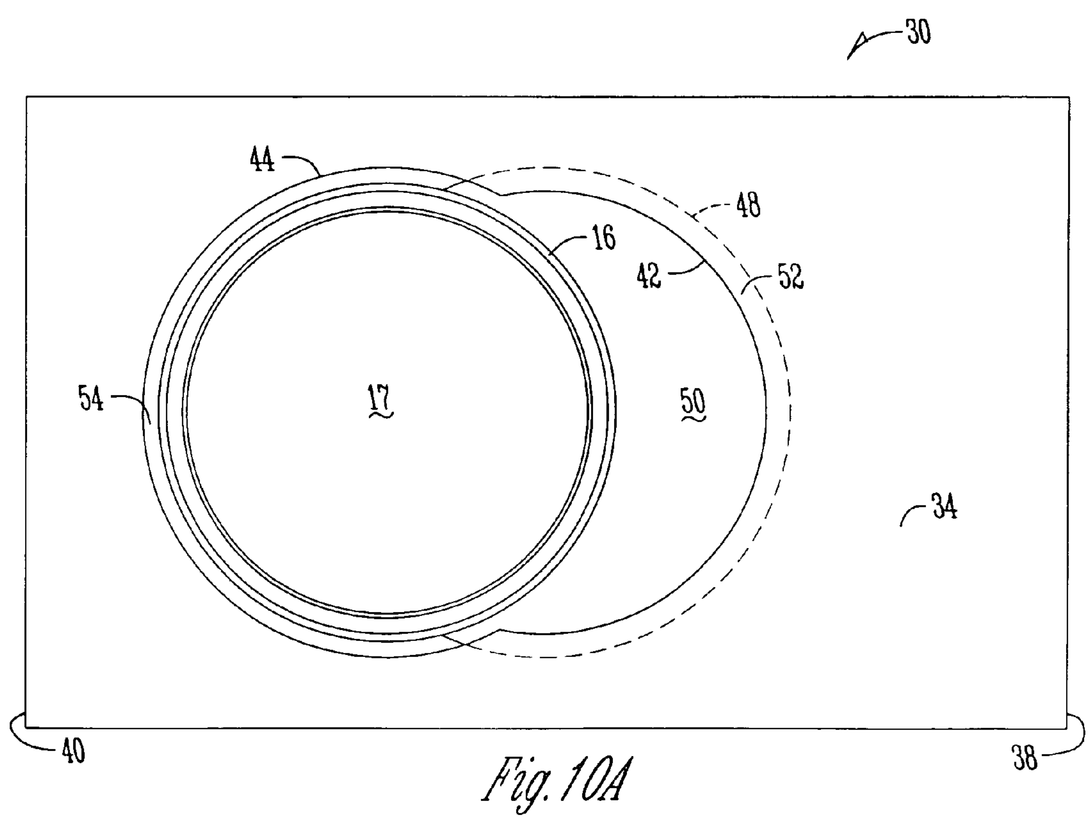
FIG. 10A is a top view of one embodiment of a blade in a rest position.

FIGS. 10-14 show how the bottom lid or the lid to be dispensed 17 and the stack of lids 14 engage and interact with the blade 30 during dispensing of the lid 17. FIGS. 10 and 10A show a side view and top view respectively of the preferred embodiment of the blade 30 in relation to the stack of lids 14 in the resting position for the blade 30. The stack of lids 14 rests upon the first lid or the lid to be dispensed 17 which is supported by the lid rim 16, which is in turn supported by the blade third cutout ledge 54.

Figure 11:
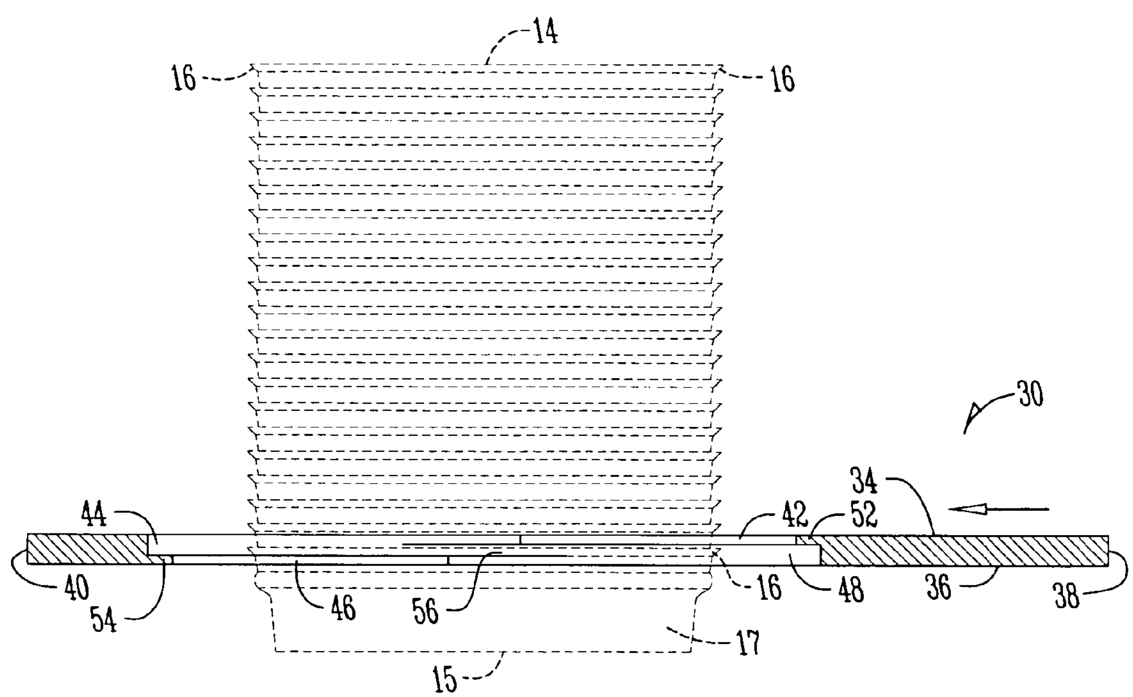
FIG. 11 is a side view of one embodiment of a blade at one-half the forward motion position.
Figure 11A:
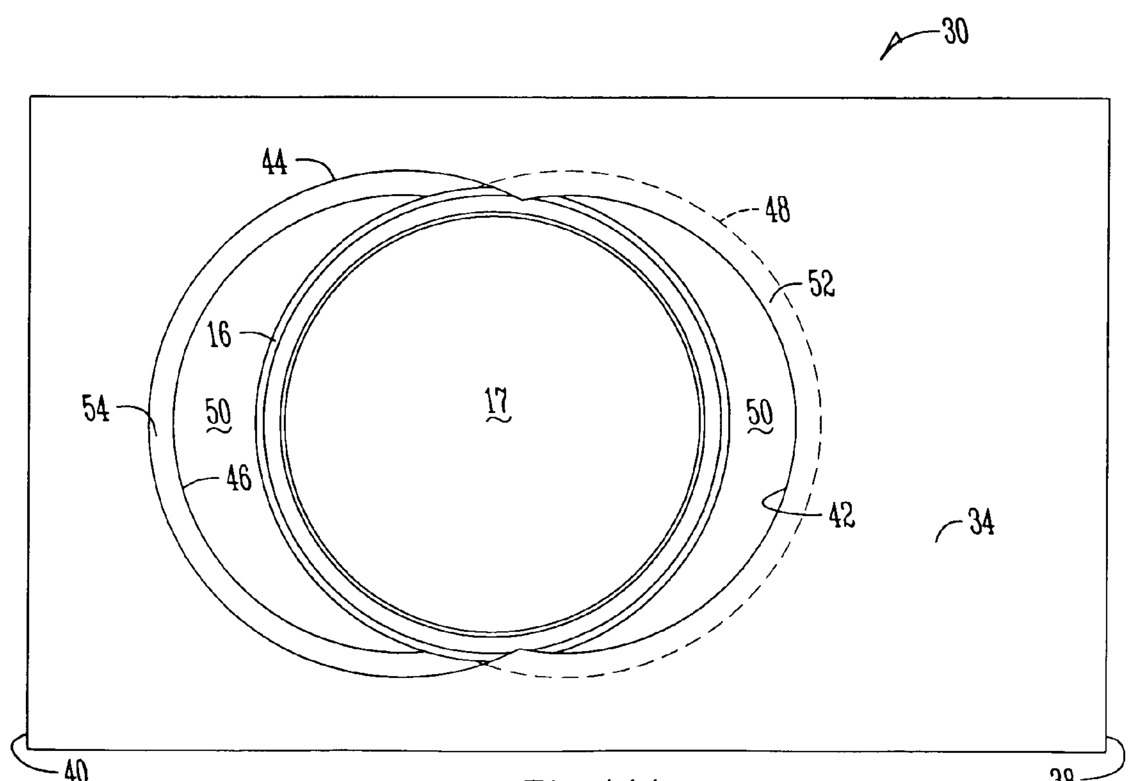
FIG. 11A is a top view of one embodiment of a blade at one-half the forward motion position.

As the blade 30 is moved through one-half of the forward motion, as shown in FIGS. 11 and 11A, the lid stack 14 and the bottom lid 17 are prevented from sliding by the base unit 18 and/or the lid holder assembly 12. In this manner, the blade 30 slides, but the bottom lid 17 and the lid stack 14 do not. The lid rim 16 of the bottom lid 17 is still supported by the third cutout ledge 54 and the remainder of the rim stack 14 now becomes supported by the blade first cutout ledge 52 as the blade 30 slides.

Figure 12:
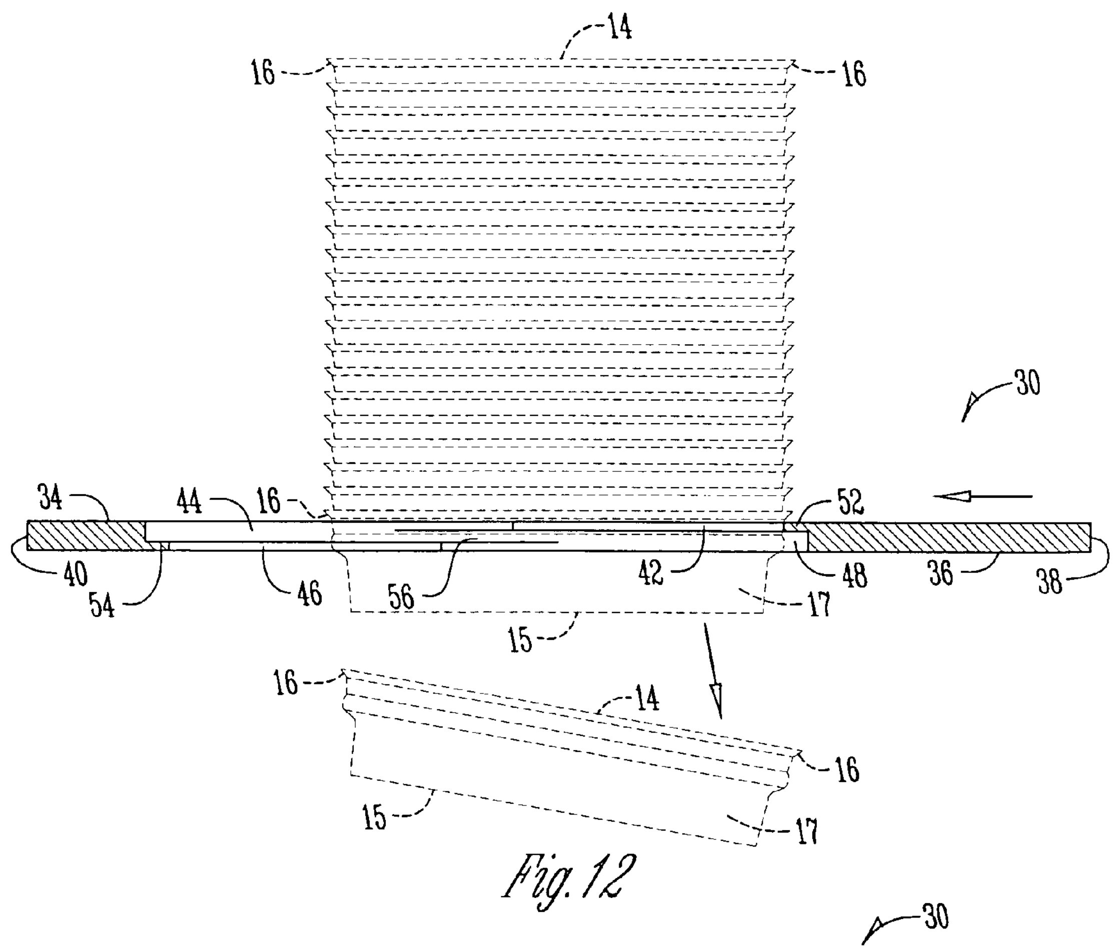
FIG. 12 is a side view of one embodiment of a blade at a full forward motion position.
Figure 12A:
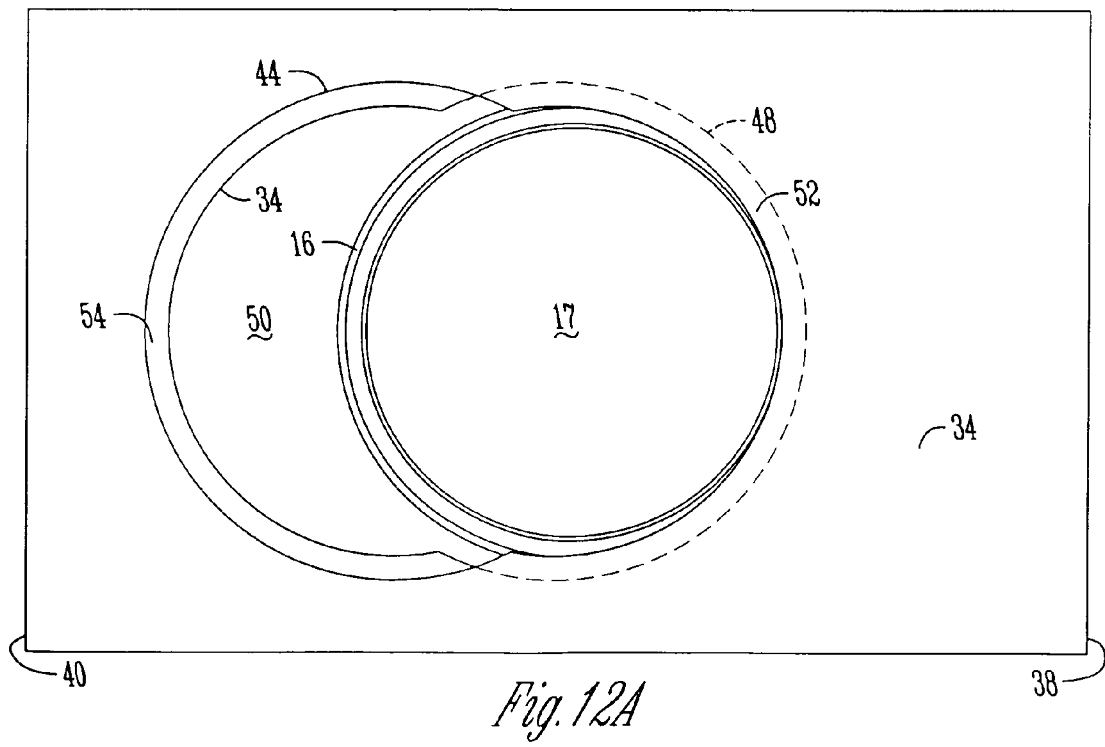
FIG. 12A is a top view of one embodiment of a blade at a full forward motion position.

FIGS. 12 and 12A show the blade 30 in the full forward motion position with respect to the lid stack 14. Here, the bottom lid 17 is no longer supported by the blade third cutout ledge 54 and falls through the blade fourth cutout 48 to be dispensed. In addition, the remaining stack of lids 14 is supported by the lid rim 16 on the new bottom lid by the blade first cutout ledge 52.

Figure 13:
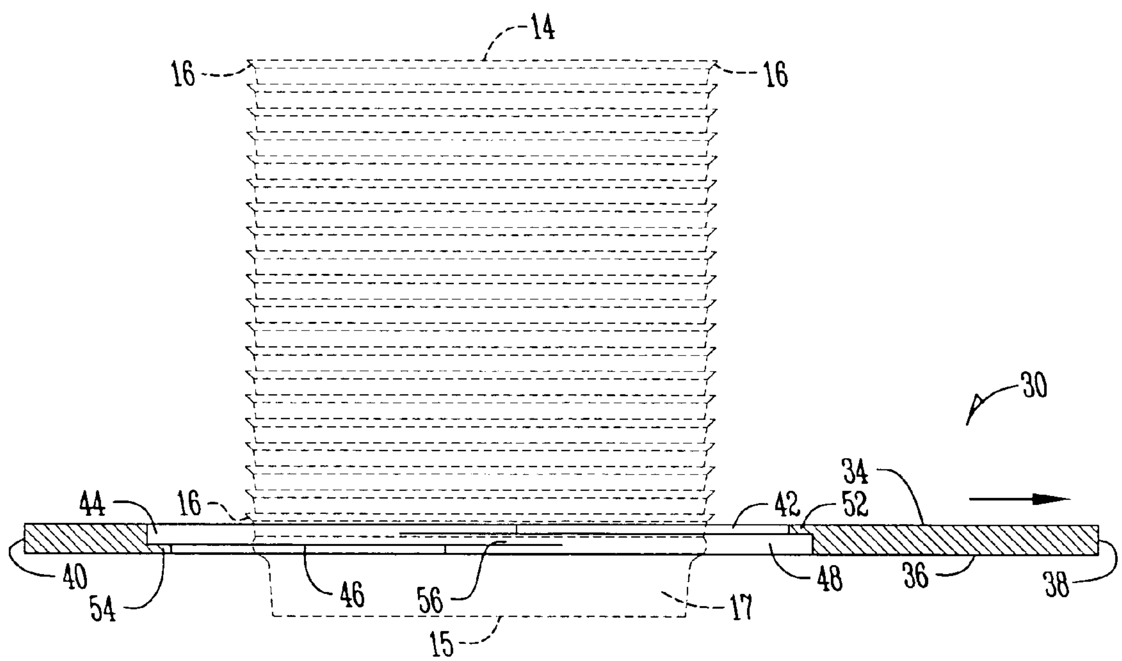
FIG. 13 is a side view of one embodiment of a blade at one-half of the return motion position.

FIG. 13 shows the blade 30 in the half return motion position with respect to the lid stack 14. The lid stack 14 is still supported by the lid rim 16 of the new bottom lid 17 by the blade first Cutout ledge 52.

Figure 14:
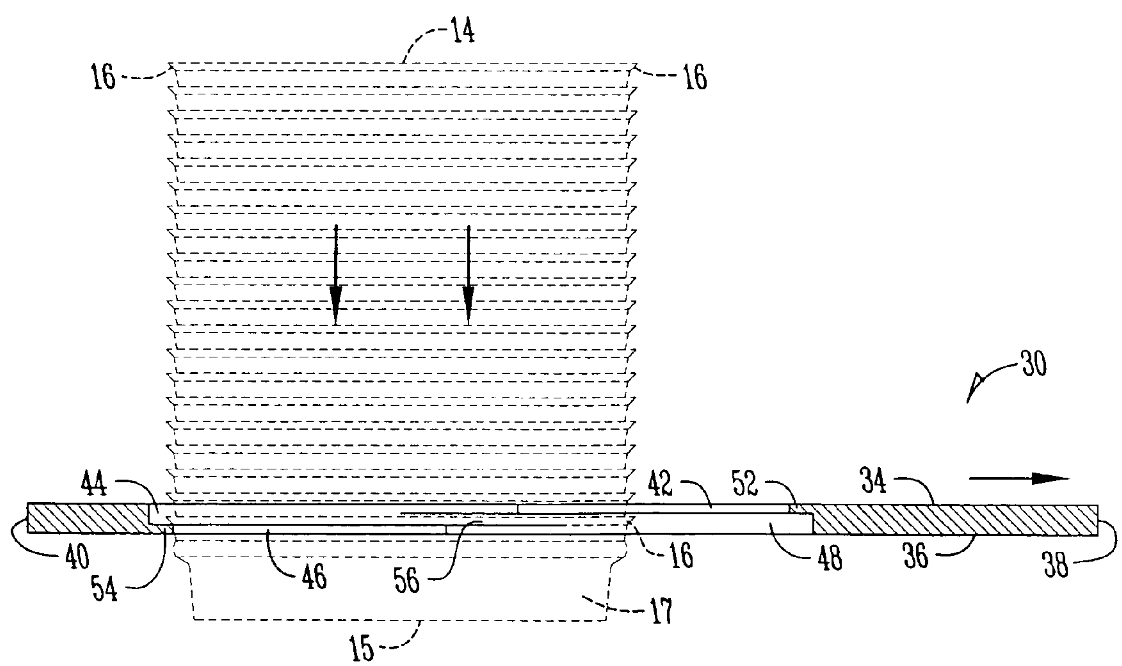
FIG. 14 is a side view of one embodiment of a blade at full return motion position.

FIG. 14 shows the lid stack 14 in relation to the blade 30 at a full return motion position. This position allows the lid dispenser assembly 10 to reset and be ready to dispense another lid 17. In the full return motion position, the stack of lids 14 falls from a height of the blade first cutout ledge 52 to the blade third cutout ledge 54. The lid dispenser assembly 10 is now ready and reset to dispense another lid 17.

It is preferred that the blade 30 be positioned relative to the lid stack 14 with the lid stack 14 resting upon the blade third cutout ledge 54. However, the lid dispenser assembly 10 is still operable with the lid stack 14 resting upon the blade first cutout ledge 52 in the rest position. Also, the lid stack 14 can be positioned in the lid holder assembly 12 in either an upright or upside down position. The lid dispenser assembly 10 will still dispense the lids 17 as long as the lid rim 16 can be supported by the blade first cutout ledge 52 and the blade third cutout ledge 54 and can also pass through the blade groove 56 and the blade second cutout 44 and the blade fourth cutout 48.

Figure 19:
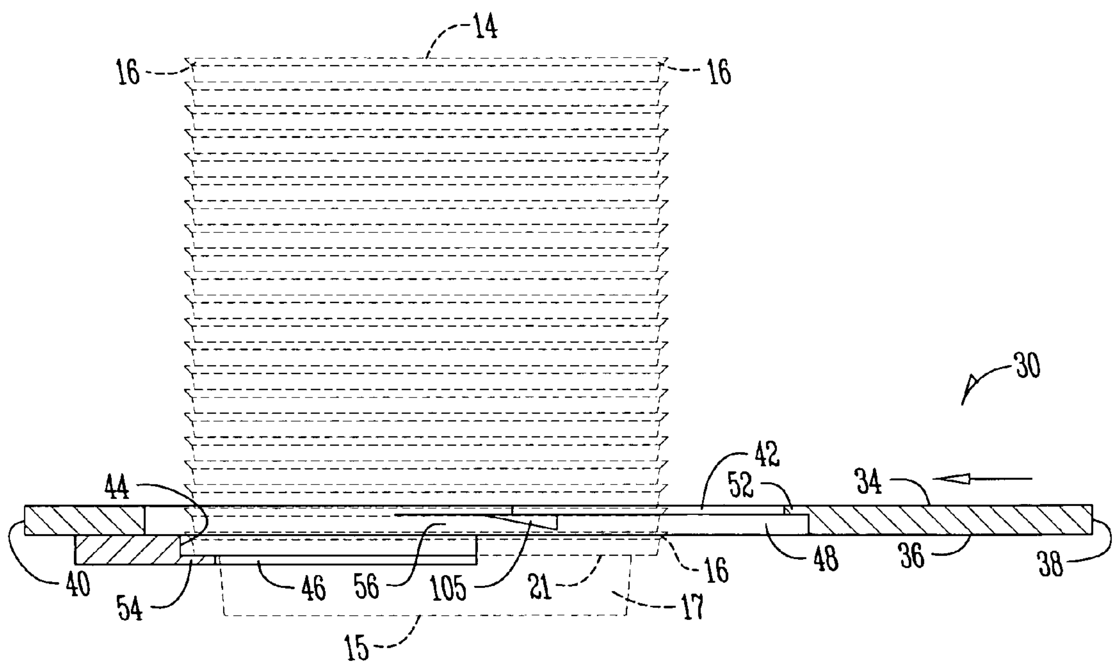
FIG. 19 is a side view of an embodiment of a blade in a rest position.
Figure 19A:
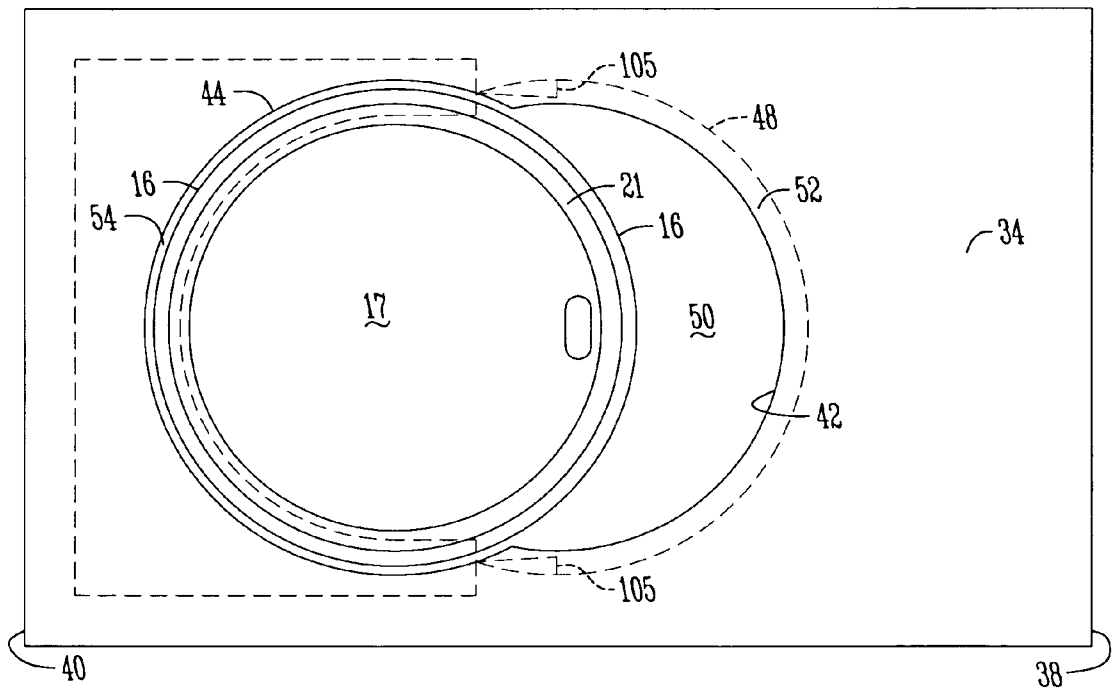
FIG. 19A is a top view of one embodiment of a blade in a rest position.
Figure 20:
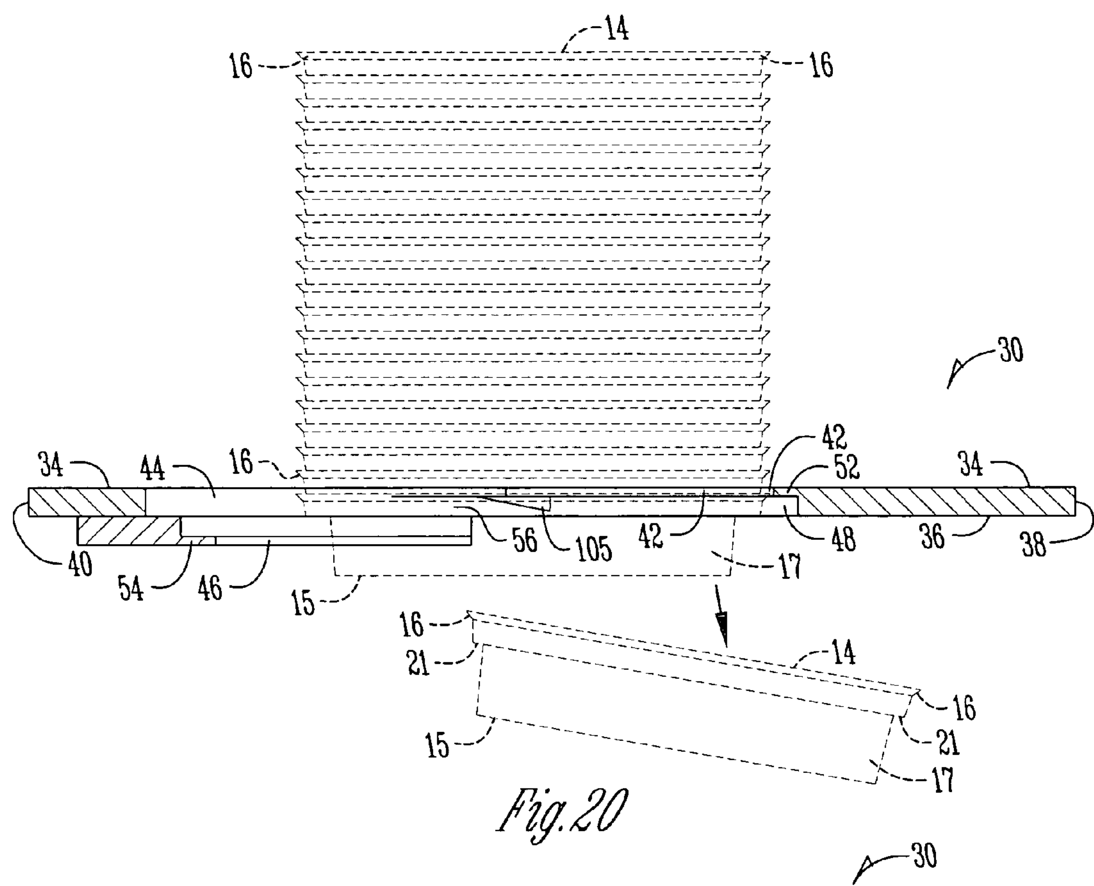
FIG. 20 is a side view of one embodiment of a blade at a full forward motion position.
Figure 20A:
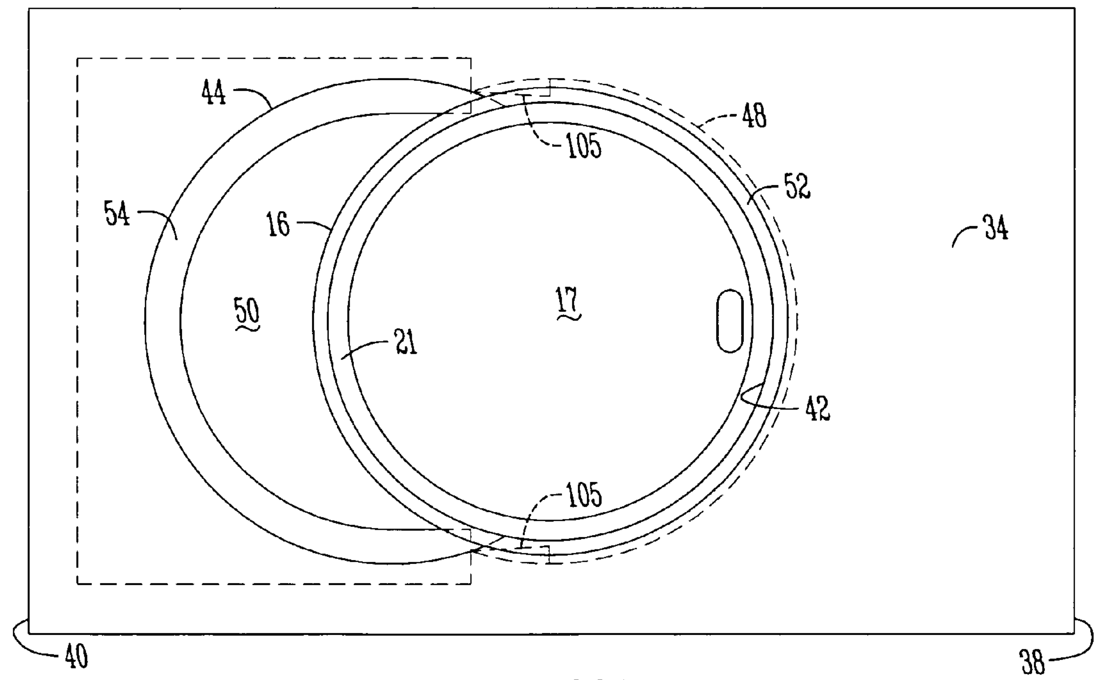
FIG. 20A is a top view of one embodiment of a blade at a full forward motion position.

FIGS. 19-20 show another embodiment of the blade 30. This blade 30 has the blade third cutout ledge 54 extend further into blade third cutout 46. This allows the third cutout ledge 54 to hold the lids 14, 17 by having the lid ridge 21 rest on the third cutout ledge 54, rather than having the lid rim 16 rest on the third cutout ledge 54. For lids 14, 17 having a lid ridge 21, this holds the lids 14, 17 more securely. However, the operation of dispenser 10 and blade 30 in this embodiment are like that previously described.

Figure 15A:
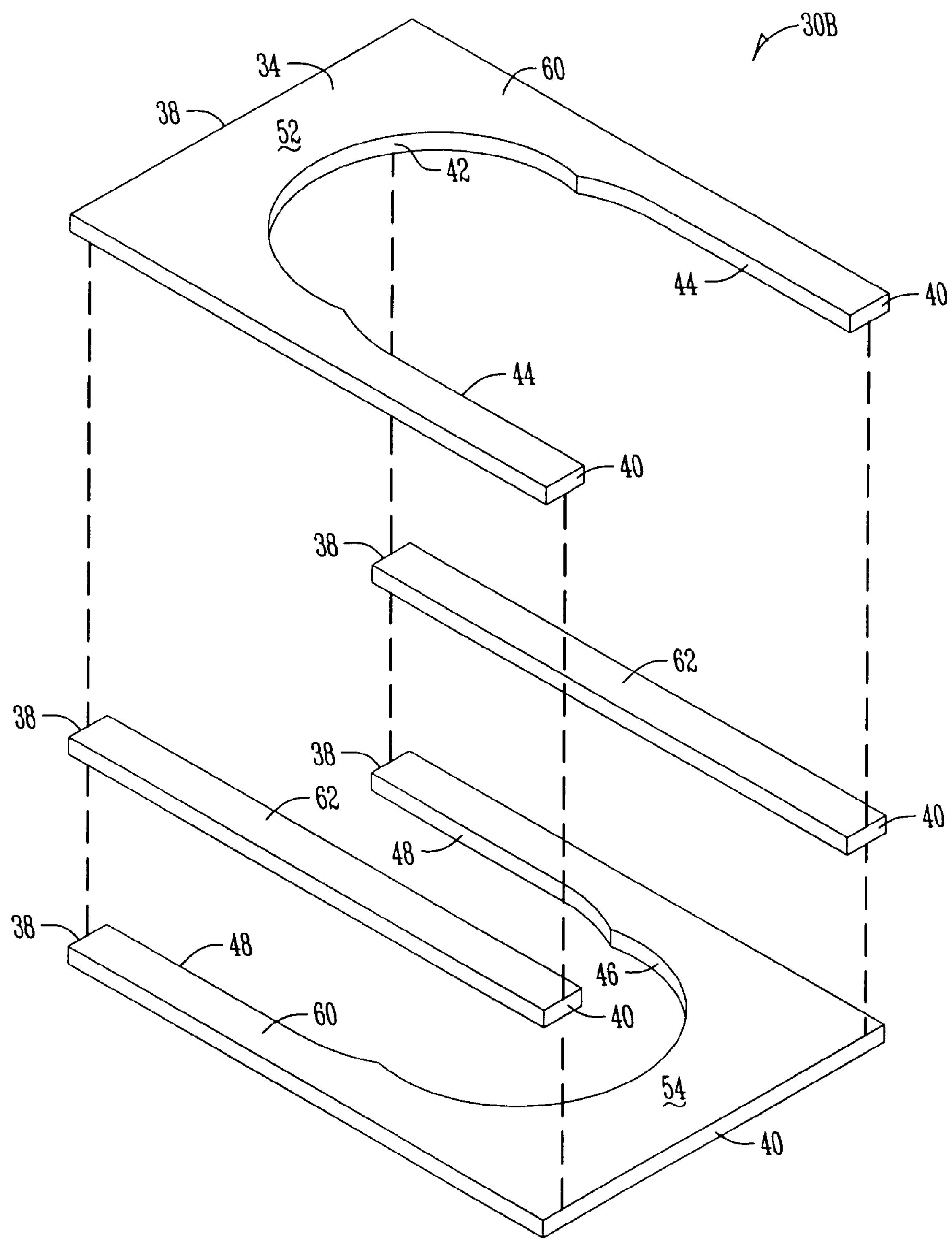
FIG. 15A is an exploded view of one embodiment of the blade assembly.
Figure 15B:
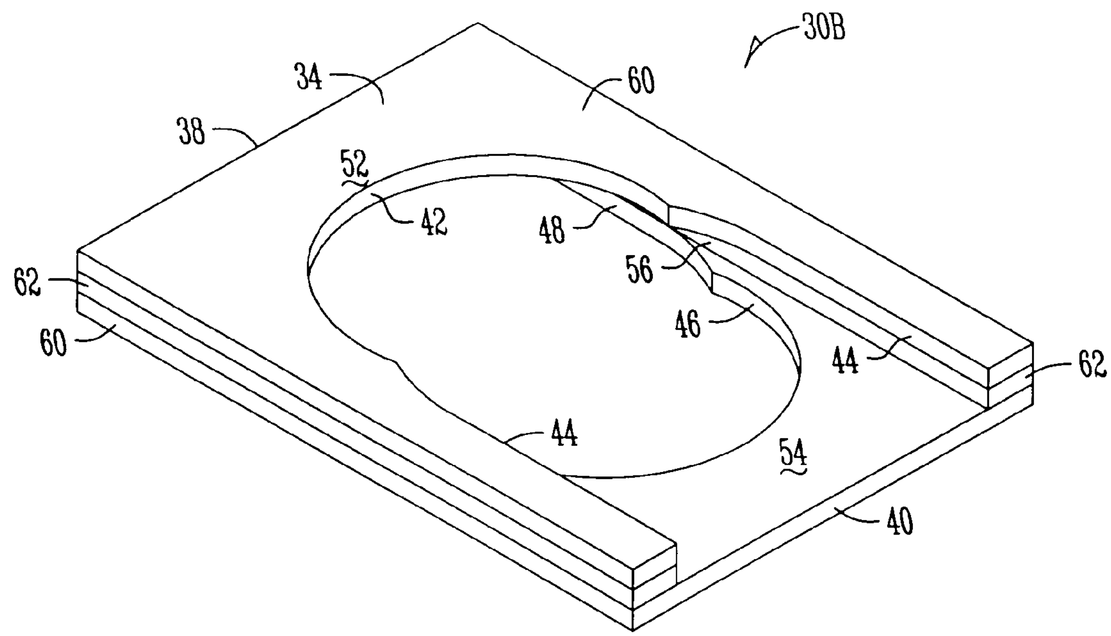
FIG. 15B is a perspective view of one embodiment of an assembled blade.
Figure 15C:
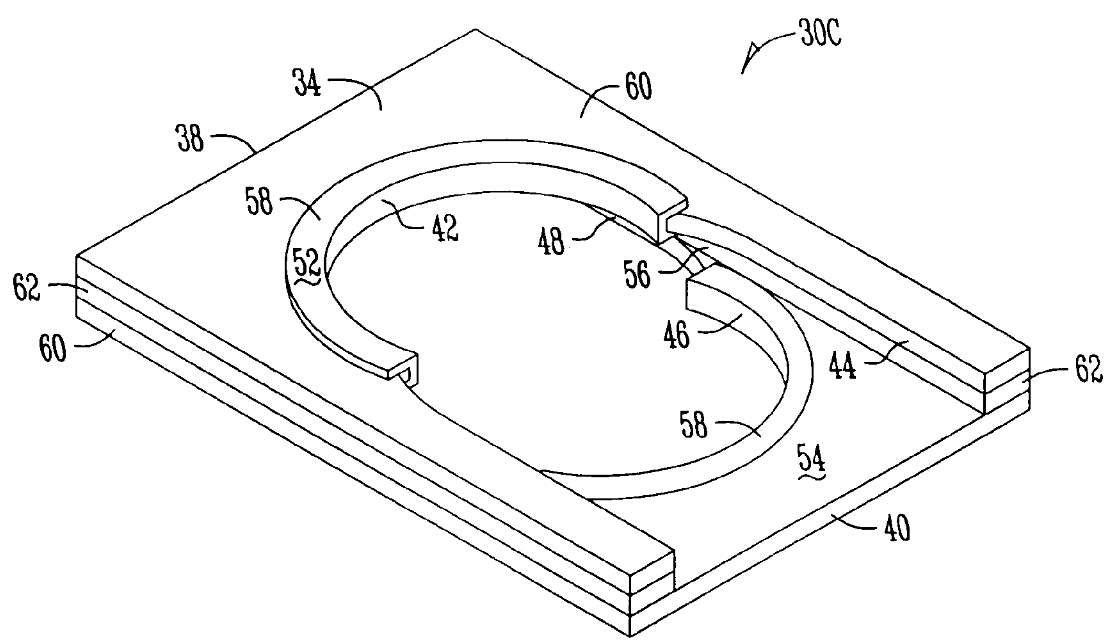
FIG. 15C is a perspective view of another embodiment of an assembled blade.

The blade 30 can be constructed from a single piece of material or from multiple pieces of material as seen in FIGS. 15A-C. Any number and shape of pieces can be used to construct the blade 30B. The blade 30B shown in FIGS. 15A-C comprises two blade plates 60 and two blade spacers 62. The two blade plates 60, in this example, are made the same as one another and then located together in an opposite orientation with a blade spacer 62 on each side. The parts can be held together in any manner. The blade spacer 62 should be appropriately sized to allow the formation of a groove 56 in the blade between the third cutout 46 and the first cutout 42. Again, this groove 56 allows room for the lid rim 16 to pass through from the blade third cutout ledge 54 and out the blade fourth cutout 48 to be dispensed.

Also shown in FIG. 15C are blade size adjusting inserts 58. These inserts 58 can be any size or shape which will work for both supporting the lid stack 14 and dispensing the lid 17. The purpose of the blade size adjusting insert 58 is to allow a single blade 30C to be manufactured for many sizes of lids. Then, an insert 58 can be used to size the cutouts to the proper size and or shape to match the lid to be dispensed as discussed above.

Figure 21:
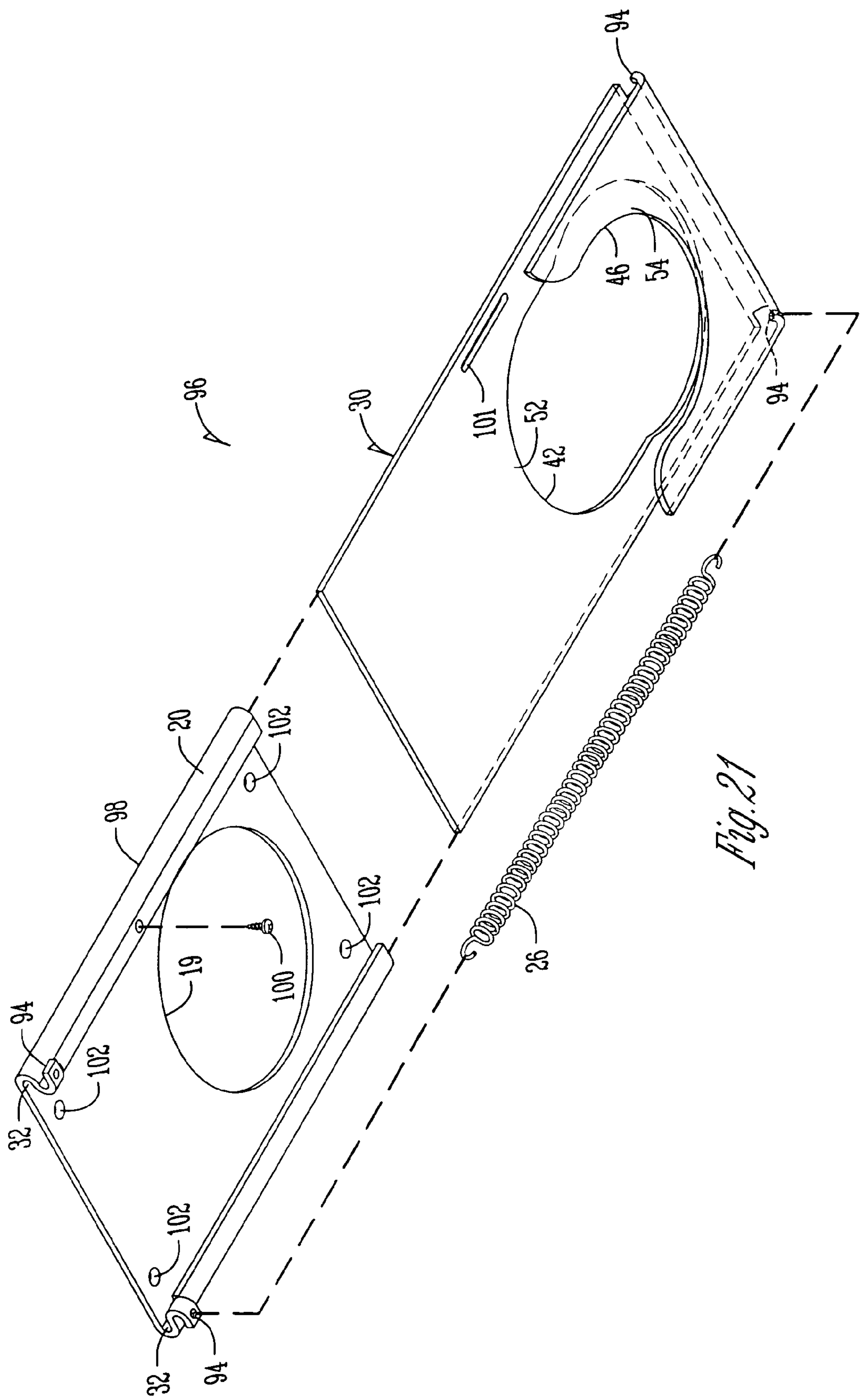
FIG. 21 is an expanded perspective view of one embodiment of a blade cassette assembly.

FIG. 21 shows an expanded view of one embodiment of the blade 30 used in a blade cassette assembly 96. The cassette assembly 96 has a cassette body 98, a blade 30 and a spring 26. The blade 30 slides along or within the blade channel 32 in a cassette body 98. The cassette assembly 96 works like the dispenser assemblies 10 previously described, but the cassette assembly 96 has the base unit opening 19, for holding the lid stack 14 in place, mated with the blade 30 so that the cassette assembly 96 can quickly and easily be mounted to a base unit assembly 18. The cassette assembly 96 allows different sizes of base unit assemblies 18 to mate with different sizes of blades 30 since the opening 19 will be sized to match the blade 30 in the cassette assembly 96. In other words, the cassette assembly 96 allows one size of base unit to mate to different sized cassette assemblies for dispensing different size lids 14, 17.

The cassette assembly 96 has a blade travel limiting screw 100 which mates with a groove 101 in the blade 30 for limiting the travel distance of the blade 30 in the cassette assembly 96 and for aligning the blade with the opening 19. Additionally, the cassette body 98 has cassette mounting holes 102 for passing a fastener through to mount the cassette assembly 96 to the base unit assembly 18.

The invention has been shown and described above with the preferred embodiments, and it is understood that many modifications, substitutions, and additions may be made which are within the intended spirit and scope of the invention.

What is claimed is:

1. A lid dispensing device comprising:

a base unit;

a lid holder operatively connected to the base unit for holding a stack of lids; and a slidable blade cassette assembly constructed from sheet material folded back on itself and operatively mounted to the base below the stack of lids, the assembly including a blade moveable in the assembly between a first position and a second position and wherein the stack of lids is supported by the blade engaging a first lid in the stack of lids while the blade is in the first position and wherein the blade allows the first lid to fall away from the stack of lids through the cassette assembly and an aperture in the blade while still supporting the remaining lids in the stack of lids as the blade moves to the second position, the blade including a horizontal groove within the cassette assembly and wherein the blade slides horizontally within the base unit:

wherein the blade includes:

opposite first and second faces and opposite first and second ends, a first cutout on the first face near the first end, a second cutout on the first face near the second end which intersects the first cutout and is larger than the first cutout; a third cutout on the second face near the second end, wherein the cutouts on the first face form an aperture through the blade, and wherein the groove is in between the cutouts and approximately parallel to the faces of the blade near the intersection of the cutouts.

2. The device of claim 1 wherein one or more of the cutouts form a ledge which supports the lids.

3. The device of claim 1 wherein the blade is assembled from multiple pieces.

4. The device of claim 1 further comprising a plurality of lid holders and a plurality of blade cassette assemblies.

5. The device of claim 1 further comprising a biasing device for returning the blade to the first position.

* * * * *